United States Patent [19]

Baugh

[11] Patent Number: 5,076,594
[45] Date of Patent: Dec. 31, 1991

[54] SEALING CONNECTION BETWEEN TUBULAR MEMBERS

[76] Inventor: Hollis A. Baugh, 12811 Naples La., Stafford, Tex. 77477

[21] Appl. No.: 410,432

[22] Filed: Sep. 21, 1989

Related U.S. Application Data

[63] Continuation-in-part of Ser. No. 269,578, Nov. 10, 1988, abandoned.

[51] Int. Cl.$^5$ ............................................. F16J 15/08
[52] U.S. Cl. ............................ 277/205; 277/207 A; 277/236; 285/111; 285/921
[58] Field of Search ............... 277/47, 116.4, 116.8, 277/205, 206 A, 206 R, 207 A, 236, 207 R, DIG. 2; 285/23, 24, 305, 330, 336, 347, 354, 355, 345, 917, 921, 110, 111, 341

[56] References Cited

U.S. PATENT DOCUMENTS

| | | | |
|---|---|---|---|
| 3,279,806 | 10/1966 | Bialkowski | 277/205 |
| 3,285,615 | 11/1966 | Trbovich | 277/180 |
| 3,784,235 | 1/1974 | Kessler et al. | 285/921 X |
| 4,422,673 | 12/1983 | Blackford et al. | 285/23 |
| 4,529,211 | 7/1985 | Rodgers | 277/207 A X |
| 4,553,759 | 11/1985 | Kilmoyer | 277/205 X |
| 4,779,902 | 10/1988 | Lee | 285/921 X |
| 4,805,943 | 2/1989 | Balsells | 285/305 X |

FOREIGN PATENT DOCUMENTS

| | | | |
|---|---|---|---|
| 503859 | 7/1930 | Fed. Rep. of Germany | 277/236 |
| 561324 | 4/1957 | Italy | 277/205 |
| 36644 | 10/1935 | Netherlands | 285/345 |
| 777296 | 11/1980 | U.S.S.R. | 277/236 |
| 712786 | 7/1954 | United Kingdom | 277/236 |
| 926789 | 5/1963 | United Kingdom | 277/206 A |
| 1436310 | 5/1976 | United Kingdom | 277/207 A |

*Primary Examiner*—William A. Cuchlinski, Jr.
*Assistant Examiner*—Scott Cummings
*Attorney, Agent, or Firm*—Fulbright & Jaworski

[57] ABSTRACT

A sealing connection between first and second members having coacting telescoping ends. A resilient U-shaped metal seal ring is positioned in a groove in the first member and seals against both the first and second members and includes a soft metallic seal coating. Projections extend from the seal on each side of the soft coating for protecting the coating as the members are engaged. Recesses are provided in the second member for receiving the projections and allowing the metallic seal to engage the second member. A transitional surface on the end of the second member engages the projection means for compressing the metal seal as the members are engaged.

5 Claims, 4 Drawing Sheets

SEALING CONNECTION BETWEEN TUBULAR MEMBERS

CROSS-REFERENCE TO RELATED APPLICATIONS

This application is a continuation-in-part of application Ser. No. 07/269,578, filed Nov. 10, 1988 entitled "Click Seal", now abandoned.

BACKGROUND OF THE INVENTION

The present invention relates to metallic seals for sealing between first and second tubular members. It is conventional to use O-rings for the sealing means between male and female telescoping tubular members. Conversion to a metallic O-rings has been hampered because of the scuffing that occurs during the telescoping assembly. The scuffing of the seal surface has been a cause of failure and has allowed leakage across the sealing contact points.

The present invention relates to metallic seal system having a U-shaped cross-section for providing a large force for sealing the legs of the metallic seal against first and second coacting telescoping members while at the same time protecting the seal areas when assembling the telescoping connection.

SUMMARY OF THE INVENTION

The present invention is directed to a sealing connection between first and second tubular members in which the first and second members have coacting telescoping ends. The first member includes an annular groove adjacent the end of the first member. An annular resilient metal seal is positioned in the groove but is biased to extend out of the groove. The seal is U-shaped in cross-section and includes first and second legs and a base. The base is positioned away from the end of the first member. Seal means are provided on the outside of each of the first and second legs for seating against the first and second members, respectively. Preferably, the seal means include a soft metallic coating. Projection means extend from the second leg outwardly from the first member, preferably on each side of the seal means on the second leg for protecting the second leg seal means as the first and second members are telescopically engaged. Recess means in the second member receives the projection means and allows the second leg seal means to engage the second member. A transitional surface is provided on the end of the second member for engaging the projection means for compressing the metal seal as the first and second members are telescopically engaged.

Still a further object is wherein a seat surface is provided on the second member adjacent the recess means on the second member. Preferably the seat surface is recessed from the surface of the second member.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
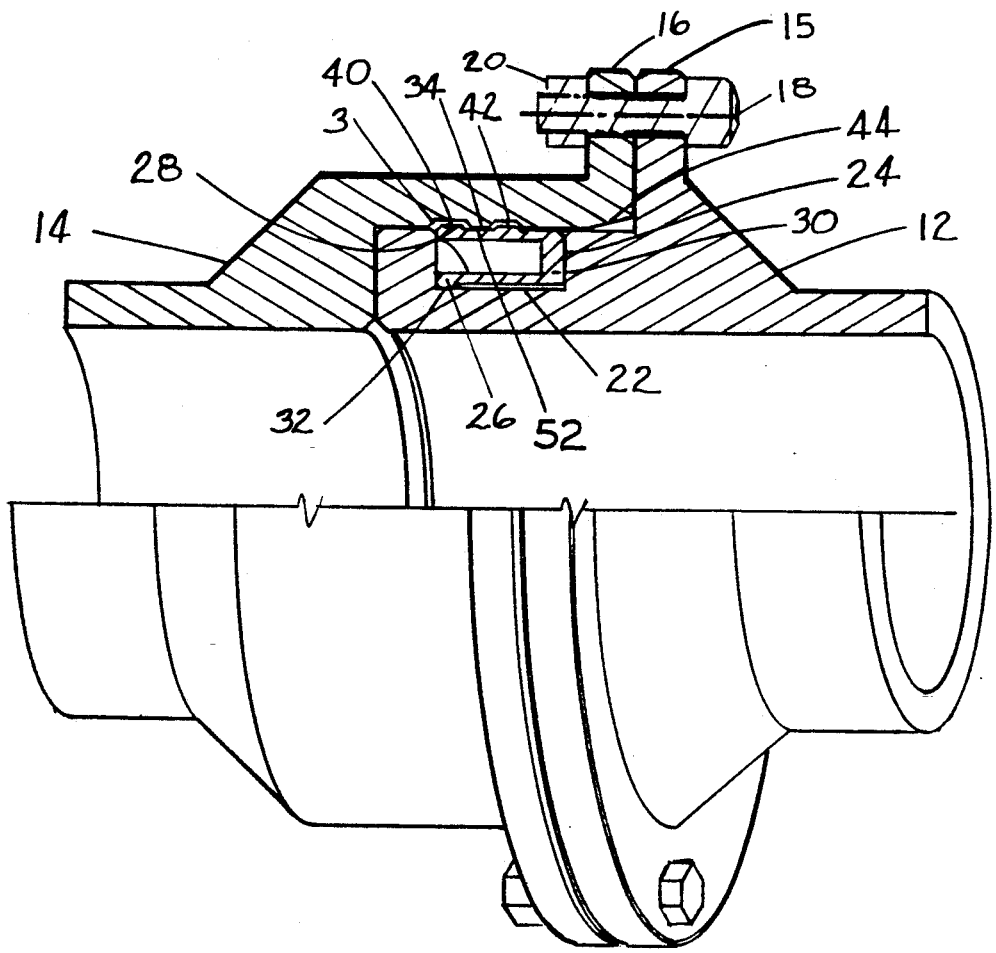
FIG. 1 is a fragmentary perspective, elevational view, partly in cross-section, illustrating the invention of the present invention in a sealing relationship.
Figure 2:
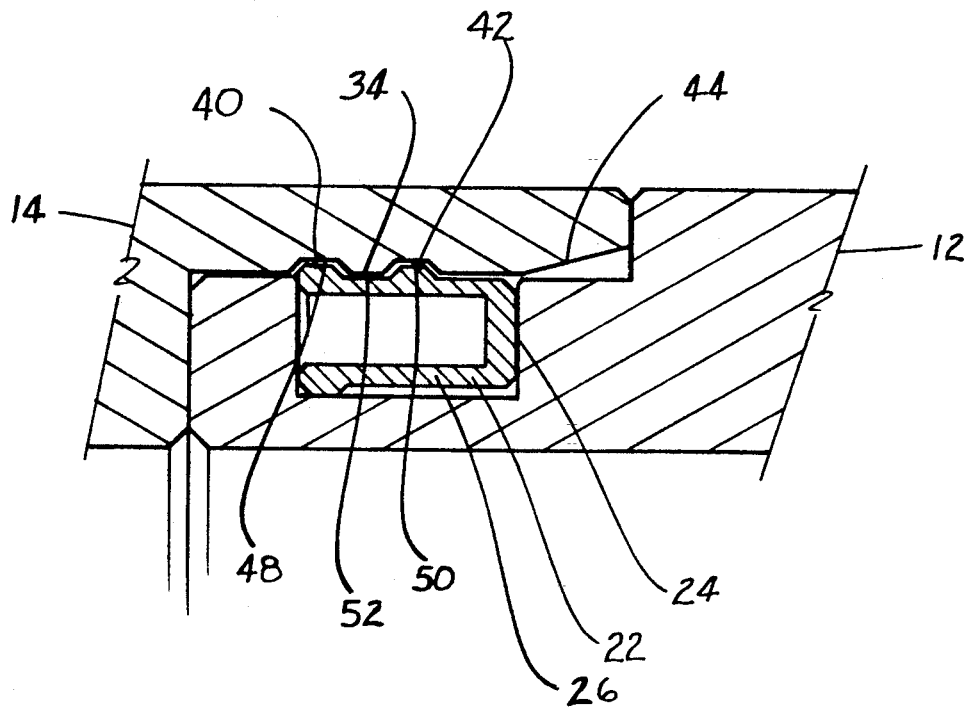
FIG. 2 is an enlarged fragmentary cross-sectional view of the sealing connection of the present invention in the sealed position.

Referring now to the drawings, particularly to FIG. 1, a tubular fluid conduit seal connection is provided between first and second tubular members 12 and 14. The first and second members have coacting telescoping ends and as shown herein the first member 12 includes a male telescoping end or a seal carrier end. The second member 14 is here shown as a female member or receiver. The first and second members 12 and 14 may be secured together by any suitable means here shown as flanges 15 and 16 connected by bolts 18 and nuts 20.

The first member 12 includes a groove 22 for receiving an annular resilient metal seal 24. The seal 24 is U-shaped in cross-section and includes a first leg 26, a second leg 28, and a base 30. The base 30 is positioned away from the end of the first member 12. A first seal means 32 is provided on the outside of the first leg 26 and a second seal means 34 is provided on the outside of the second leg 28 for sealing against the first and second members 12 and 14, respectively. The U-shaped metallic and resilient sealing ring 24 may be of any suitable material such as alloy steel. While the seal means 32 and 34 may merely be smooth surfaces on the legs 26 and 28 of the metal seal 24, preferably the seals 32 and 34 are soft metallic seals, such as gold, which are suitably applied thereon such as by plating to provide a better and softer sealing surface with the members 12 and 14, respectively.

Figure 3:
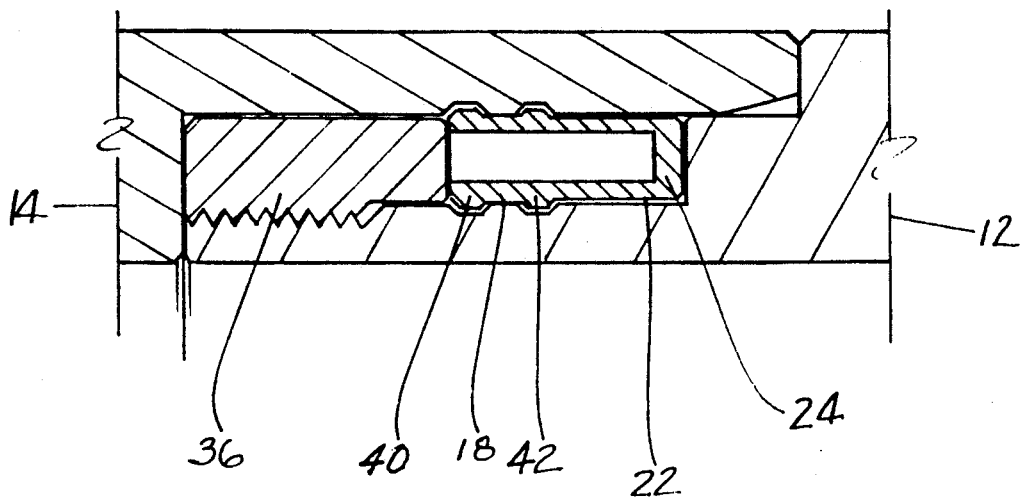
FIG. 3 is a fragmentary elevational view, in cross-section, of another embodiment of the present invention shown in the sealed condition.

The metal seal 24 may be inserted into the groove 22 by expanding it and allowing it to contract into the recess 22. Alternately, and referring to FIG. 3, the seal ring 24 is retained on the first member 12 or carrier by a removable retainer ring 36 which may be screwed into the first member 12. The use of the removable retainer ring 36 makes it possible to use a metal seal ring 24 of such a structural strength that it cannot be expanded and inserted into the groove 22 without damage to the seal means on the legs, and in particular to the soft metallic seals. Of course, if desired, and referring again to FIG. 1 the recess 22 may extend to the end of the first member 12 as the seal 24 will be backed up by the shoulder on the receiver member 14.

The U-shaped resilient metal seal 24 in its initial position, is biased out of and extends from the groove 22 in order to provide the necessary sealing force to seal the legs 26 and 28 against the first and second members 12 and 14 when they are engaged. However, because the legs 26 and 28 are biased outwardly, the seal means 34 on the second leg 28 is subject to being scuffed, scraped and damaged as the members 12 and 14 are telescoped together. The seal means 32 is protected against scuffing as it is held in the groove 22.

Figure 8:
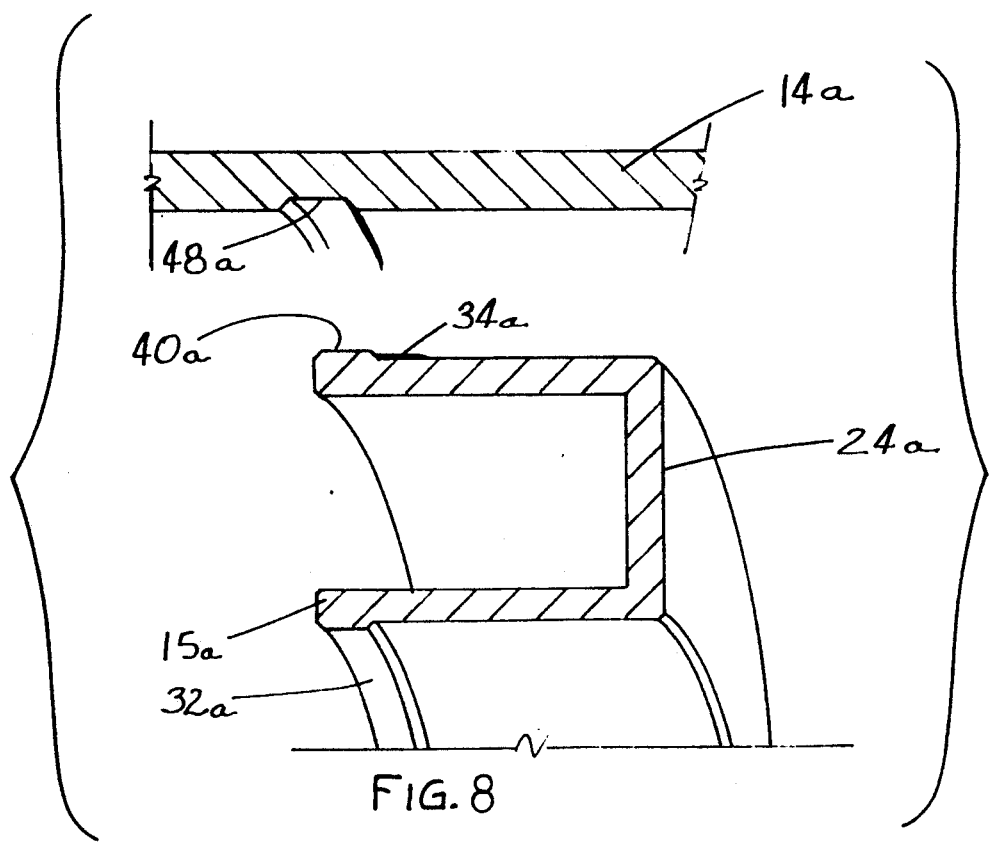
FIG. 8 is an enlarged fragmentary elevational view, partly in cross-section, illustrating another embodiment of the present invention having only one protective projection.

In order to protect the seal 34, one or more projections are provided extending from the second leg 28 towards the second member 14 and away from the first member 12. Thus projections 40 and 42 may be provided. Projection 40 is positioned ahead of the seal 34, engages the inner surface of the second member 14 and in particular a transitional surface 44. The transitional surface 44 is provided on the end of the second member 14 for engaging the projection means 40 for compressing the metal seal 24 as the first and second members 12 and 14 are telescopically engaged. This protects the soft metal seal 34 from engagement with the inside surface of the member 14 during the engagement procedure. While a single projection 40 may be used, as shown in FIG. 8, it is preferable to use a projection 40 ahead of the soft metal seal 34 and a second projection 42 behind the soft metal seal 34 for ensuring its protection. In order for the resilient legs 26 and 28 to energize the soft metal seal 34, recess means are provided in the second member 14 for receiving the projections 40 and 42 and allowing the seal 34 to engage and seal against the second member 14. Thus, when the projections 40 and 42 engage the openings 48 and 50, respectively, soft metal seal 34 will seat against the seating surface 52 on the receiver 14. The projections 40 and 42 and the recesses 48 and 50 have coacting tapered surfaces for ease in engaging and disengaging the connection between the members 12 and 14.

Figure 4:
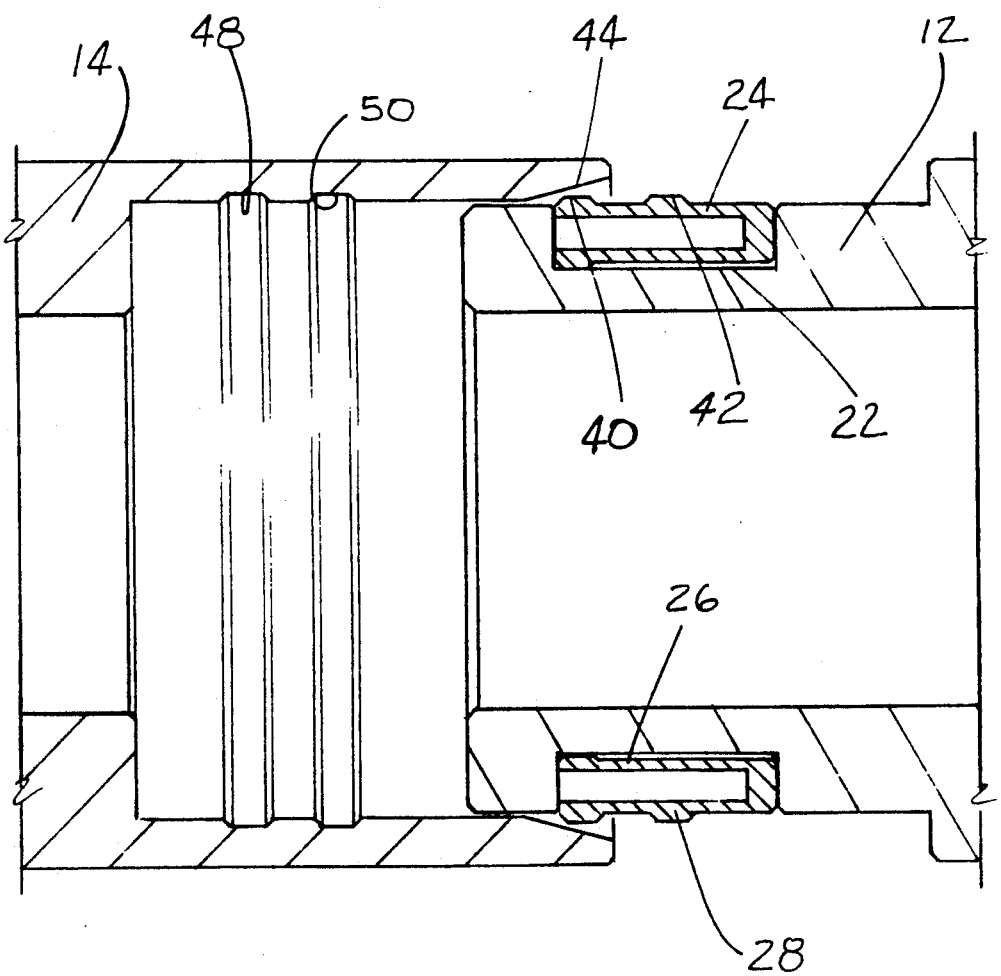
FIGS. 4, 5, and 6 are fragmentary elevational views, in cross-section, illustrating the sequence of assembling the present tubular connection with FIG. 4 shown in the initial position, FIG. 5 shown in an intermediate position, and FIG. 6 shown in the sealed position.
Figure 5:
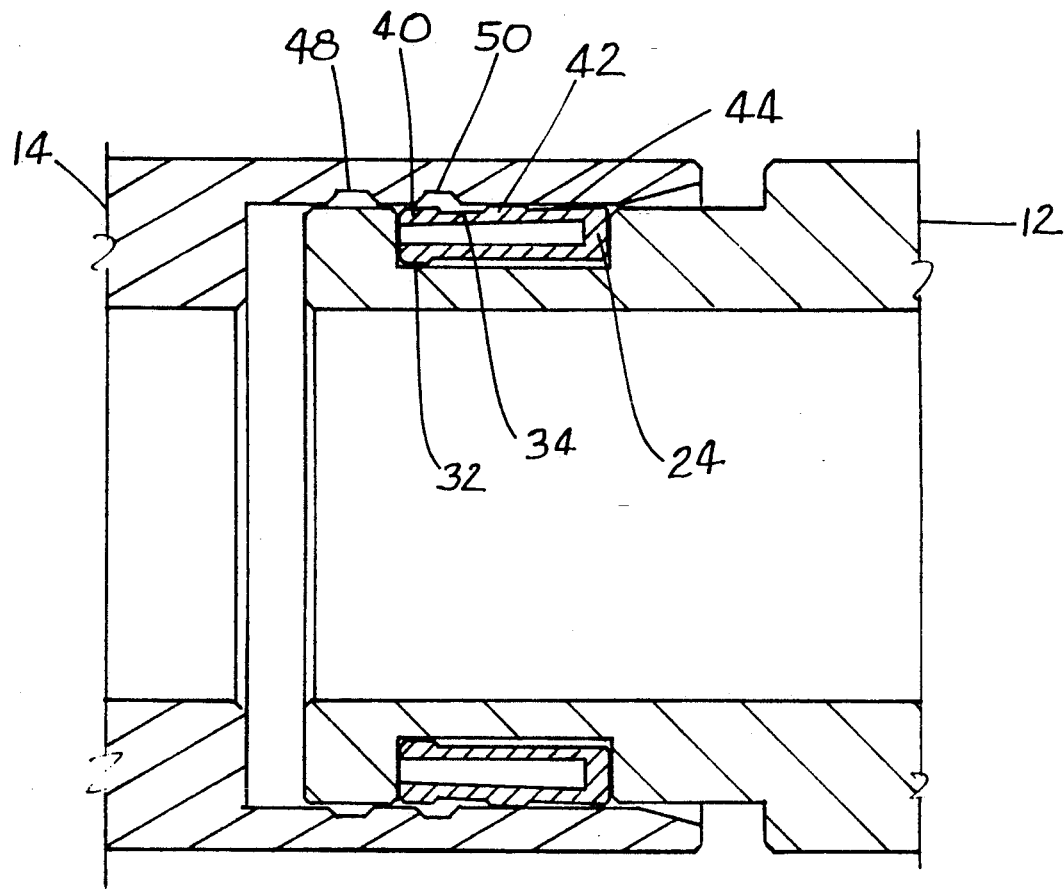
Figure 6:
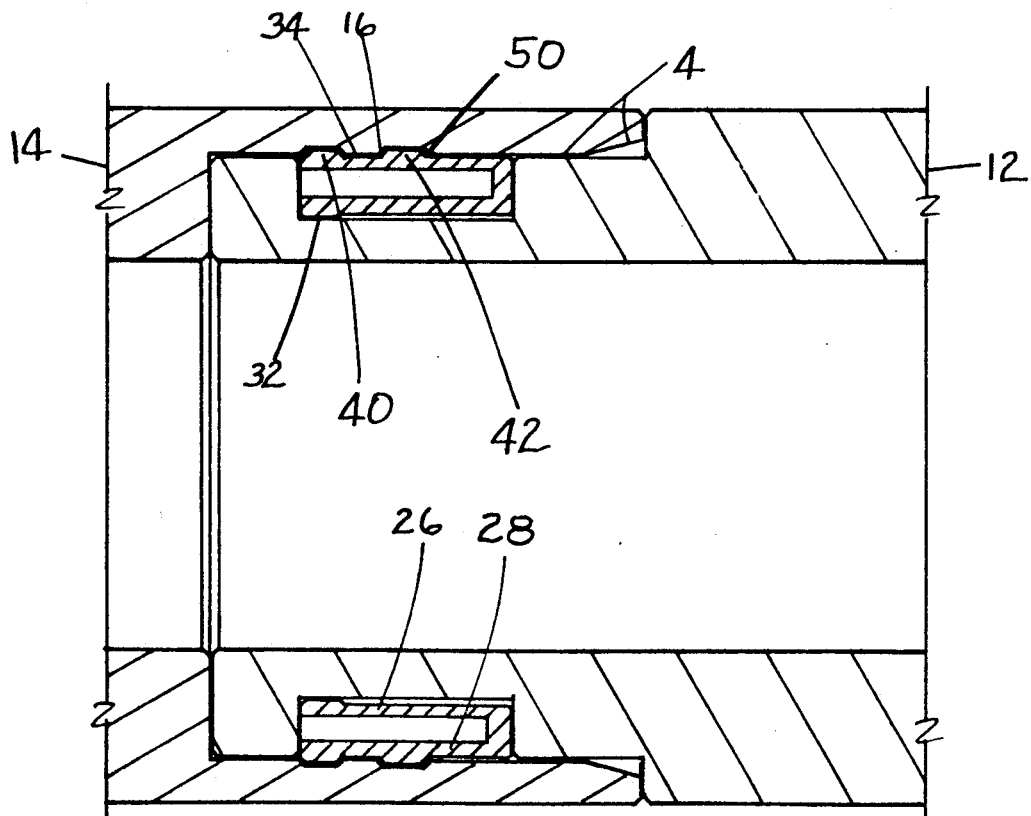

Referring now to FIGS. 4, 5 and 6, the connecting sequence between a typical carrier 12 and receiver 14 is shown in which the connecting means for holding the members 12 and 14 together is omitted. In FIG. 4, the leading protecting projection 40 makes contact with the transitional surface 44 as the end of the male member 12 enters the female member 14. In FIG. 5 as the member 12 is further telescoped into the member 14 the metal U-shaped seal ring 24 is further compressed, but the projections 40 and 42 prevent the soft metal seal 34 from rubbing against the interior of the receiver 14. In FIG. 6, the members 12 and 14 are fully engaged and the projections 40 and 42 move into the recesses 48 and 50 by the spring action of the resilient legs 26 and 28 and the soft metallic seal 34 is biased outwardly into a sealing relationship with the interior seat 52 of the receiver 14. The soft metal plating 34 is pressed against the seat 52 to complete the metal to metal seal connection.

Figure 7:
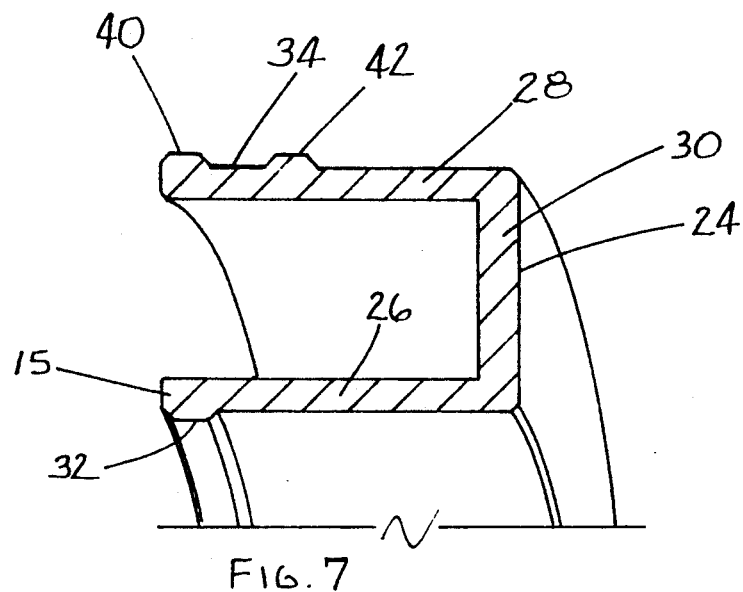
FIG. 7 is an enlarged fragmentary prospective elevational view illustrating the preferred form of the U-shaped metallic seal of the present invention.

In FIG. 7, the U-shaped resilient metal seal 24 is shown enlarged to more clearly illustrate its shape and configuration. In FIG. 7, it is noted that the metal seal 24 may include a lip 15 at the outer end of the leg 26 on which the soft metal seal 32 is plated.

Referring now to FIG. 8, another embodiment is shown wherein like parts of the previous figures include the suffix "a". In this embodiment, the U-shaped metal seal 24a only includes a single projection 40a which fits into a single recess 48a in the receiver 14a.

The present invention, therefore, is well adapted to carry out the objects and attain the ends and advantages mentioned as well of those inherent therein. While presently preferred embodiments of the invention have been for the purpose of disclosure, numerous changes in the details of construction will be readily apparent to those skilled in the art and which are encompassed within the spirit of the invention and the scope of the appended claims.

What is claimed is:

1. A sealing connection between first and second tubular members comprising, said first and second members having coacting telescoping ends, said first member having an annular groove adjacent the end of the first member, an annular resilient metal seal positioned in the groove, said seal being U-shaped in cross-section and including first and second legs and a base, said base positioned away from the end of said first member, seal means on the outside of each of the first and second legs for sealing against the first and second members, respectively, said first and second legs biased into engagement with the first and second members, respectively, projection means extending from the second leg toward the second member and positioned adjacent the seal means on the second leg preventing the second leg seal means from engagement with the second member as the first and second member are telescopically engaged, recess means in the second member for receiving the projection means, and allowing the second leg seal means to engage the second member, and a transitional surface on the end of the second member for engaging the projection means for compressing the metal seal as the first and second members are telescopically engaged.

2. The apparatus of claim 1 wherein the projection means includes first and second projections on opposite axial sides of the seal means on the second leg.

3. The apparatus of claim 1 wherein the seal means include a soft metallic coating.

4. The apparatus of claim 2 including a seat surface on the second member and recess means on the second member on opposite axial sides of the seat surface.

5. A sealing connection between first and second tubular members comprising, said first and second members having coacting telescoping ends, the first member having an annular groove adjacent the end of the first member, an annular resilient metal seal positioned in the groove but extending out of the groove, said seal being U-shaped in cross-section and including first and second legs and a base, said base positioned away from the end of said first member, said first and second legs biased into engagement with the first and second members, respectively, seal means on the outside of each of the first and second legs for sealing against the first and second members, respectively, said seal means on each of the legs including a soft metallic coating, projection means extending from the second leg radially outward from the first member on each side of the seal means on the second leg for preventing the second leg seal means from engagement with the second member as the first and second members are telescopically engaged, recess means in the second member for receiving the projection means and allowing the second leg seal means to engage the second member, and a transitional surface on the end of the second member for engaging the projection means for compressing the metal seal as the first and second members are telescopically engaged.

* * * * *